United States Patent [19]

Tchao et al.

[11] Patent Number: 5,745,716

[45] Date of Patent: Apr. 28, 1998

[54] METHOD AND APPARATUS FOR TAB ACCESS AND TAB CYCLING IN A PEN-BASED COMPUTER SYSTEM

[75] Inventors: Michael C. Tchao, Palo Alto; Stephen P. Capps, San Carlos, both of Calif.

[73] Assignee: Apple Computer, Inc., Cupertino, Calif.

[21] Appl. No.: 512,028

[22] Filed: Aug. 7, 1995

[51] Int. Cl.$^6$ .................................................... G06F 3/00
[52] U.S. Cl. ................................................................ 395/350
[58] Field of Search ........................................ 395/155, 159, 395/161, 600, 350

[56] References Cited

U.S. PATENT DOCUMENTS

| | | | |
|---|---|---|---|
| 5,237,651 | 8/1993 | Randall | 395/148 |
| 5,345,543 | 9/1994 | Capps et al. | 395/137 |
| 5,367,453 | 11/1994 | Capps et al. | 364/419.13 |
| 5,392,387 | 2/1995 | Fitzpatrick et al. | 395/156 |
| 5,428,729 | 6/1995 | Chang et al. | 395/153 |
| 5,500,929 | 3/1996 | Dickinson | 395/160 |
| 5,515,497 | 5/1996 | Itri et al. | 395/159 |

OTHER PUBLICATIONS

O'Connor, Rory J., "Apple Banking on Newton's Brain," Apr. 22, 1992, San Jose Mercury News.
Weiman, Liza and Moran, Tom, "A Step Toward the Future," Aug. 1992, Macworld Magazine.
Soviero, Marcelle M., "Your World According to Newton," Sep. 1992, Popular Science Magazine.
Abatemarco, Fred, "From the Editor," Sep. 1992, Popular Science Magazine.
Cohen, Raines, "Slimmed–Down Message Pad to Beef up RAM, Recognition," Feb. 14, 1994, MacWeek, vol. 8, No. 7, pp. 1 and 84.
Robert Carr, The Power of Penpoint, 1991, Chapter 2, pp. 26–29.

*Primary Examiner*—Raymond J. Bayerl
*Assistant Examiner*—A. Katbab
*Attorney, Agent, or Firm*—Hickman Beyer & Weaver

[57] ABSTRACT

A method implemented on a hand-held computer system for tab access to a desired portion of a list of items includes displaying the list of items on a display screen of the hand-held computer system, displaying a plurality of tabs on the display screen, and receiving a selection input with a stylus on one of the plurality of tabs, wherein the list of items scrolls to the portion of the list having as a first item an item with a first character that corresponds to one of at least two reference characters on the selected tab. A method for cycling through a series of reference characters on a tab displayed on a touch-sensitive display screen of a pen-based computer system includes determining whether a first character of a first item corresponds with one of the series of reference characters on a selected tab, and if so, determining which position in the series the first character holds, and scrolling the displayed list to a portion having a first item with a first character corresponding to a reference character having a next position in the series. A hand-held computer system includes a CPU, a memory in communication with the CPU, a display device in communication with the CPU, and a stylus interacting with the display device. The display device displays a list of items, and further displays a plurality of tabs, the tabs indexing the list of items and having at least two associated reference characters per tab. The stylus interacts with the display device to select one of the plurality of tabs, wherein the selection initiates scrolling to a portion of the list having an item with a first character that corresponds to one of the at least two associated reference characters on the selected tab.

29 Claims, 8 Drawing Sheets

| 17579 | Strasburg | 0-1 |
|---|---|---|
| 28603 | Hickory | 2-3 |
| 33326 | Ft Lauderdale | 4-5 |
| 38186 | Memphis | 6-7 |
| 55337 | Burnsville | 8-9 |
| 77546 | Friendswood | |
| 91189 | Pasadena | |
| 94115 | San Francisco | |
| 95062 | Woodside | ⊠ |

METHOD AND APPARATUS FOR TAB ACCESS AND TAB CYCLING IN A PEN-BASED COMPUTER SYSTEM

BACKGROUND OF THE INVENTION

The present invention relates generally to computer systems, and more particularly to tab access for pen-based computer systems.

Computers are becoming increasingly powerful, lightweight, and portable. The computing power of computers that once filled entire rooms is now residing on a desktop. Laptop, notebook, and sub-notebook computers are virtually as powerful as their desktop counterparts. Even smaller hand-held computer are now capable of computing tasks that required a much larger machine a few short years ago.

As a part of this trend, computerized personal organizers are becoming increasingly popular with a large segment of the population. Computerized personal organizers tend to be small, lightweight, and relatively inexpensive, and can perform such functions as keeping a calendar, an address book, a to-do list, etc. While many of these functions can also be provided in conventional computer systems, personal organizers are very well suited to the personal organization task due to their small size and portability. Personal organizers are available from many companies including Sharp and Casio of Japan.

A relatively new form of computer, the pen-based computer system, holds forth the promise of a marriage of the power of a general purpose computer with the functionality and small size of a personal organizer. An example of a pen-based computer system is the Newton® 120 pen-based computer made and marketed by Apple Computer, Inc. of Cupertino, Calif.

A pen-based computer system is typically a small, hand-held computer where the primary method for inputting data includes a "pen" or stylus. A pen-based computer system is commonly housed in a generally rectangular enclosure, and is provided with a dual-function display assembly that can serve as both an input device and an output device. When operating as an input device or "tablet", the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad, among other functions. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. By "ink" it is meant that pixels on the screen are activated in such a manner that it appears that the stylus is leaving a trail of ink on the display assembly. With suitable recognition software, the "ink" can be recognized to input text, numerics, graphics, and other recognized information into the pen-based system.

A limitation of pen-based, hand-held computer systems is their relatively small display space. Accordingly, when displaying large lists of items in a normal font size, only a small fraction of such lists can be displayed on the available display space. In non-electronic systems containing large listings of items, such as address books, tabs have been used to access a portion of the list. As an example, mechanical tabs have been used in some address books to allow users to move a slider button to a chosen letter and then press a button to have the address book open to that letter. Of course, such mechanical tabs are not functional on pen-based computer systems. However, at least Apple Hypercard® for desktop computers has employed "electronic" indexing tabs that when selected cause the computer to display of a portion of a list corresponding to the selected character. Unfortunately, such index systems are not directly usable with pen-based computer systems because they were designed to be used on average to large-sized display systems (i.e., monitors for desktop computers), and as such, contain too many tabs to allow all of the tabs to be displayed on the pen-based computer's small display screen. This defeats one of the goals of an indexing system, which is to allow all or most all of the entries of the index to be displayed on one or a few screen pages.

What is needed therefore is a system and method for allowing straightforward and convenient access to a portion of a list of items in the limited display space of a pen-based, hand-held computer system.

SUMMARY OF THE INVENTION

The present invention provides system and method aspects to address these needs. Specifically, the invention provides the ability to quickly move between displays of various portions of a larger list which is stored in the computer system. Each such displayed portion contains a subset of the larger list and displays items in same sequential order as they are stored in the larger list. The various displayed portions are accessed by selecting index tabs which include multiple reference characters, each of which specifies a character common to certain items in the larger stored list.

In accordance with one aspect of the present invention, a method is implemented on a computer system for tab access to a desired portion of a list of items. This method may be characterized as including the following steps: (1) displaying on a display screen of the hand-held computer system a first displayed portion of the list of items; (2) displaying on the display screen a plurality of tabs, each tab displaying a series of at least two associated reference characters, with each reference character on the plurality of tabs indexing an item in the list; (3) receiving a selection input with a pointer on one of the plurality of tabs; and (4) replacing the first displayed portion of the list with a second displayed portion of the list which second displayed portion has as a first displayed item an item with a first character that corresponds to one of the at least two associated reference characters displayed on the selected tab.

In preferred embodiments, the hand-held computer system is a pen-based computer system, the display screen is a touch-sensitive display screen, and the pointer is a stylus. Further, the selection input is preferably a tap with the stylus on one of the tabs displayed on the display screen.

In one embodiment, the reference characters include alphabetic characters, and in a second embodiment, the reference characters include numeric characters. Typically, the "first displayed item" will be displayed at the top of the display screen. Further, the selected tab typically will be highlighted on the display screen.

In the step of replacing the first displayed portion of the list, the content of the second displayed portion of the list will be determined based upon (1) the tab that has just been selected, and (2) the previously selected tab. In a preferred embodiment, the method will include step of "cycling" through the series of at least two associated reference characters when at least two successive selection inputs are received on a single selected tab. Cycling can be characterized by the following steps: (1) determining whether the first character of the first item of the first displayed portion of the list corresponds to one of the series of at least two associated reference characters on the selected tab; (2) when the first character of the first item of the first displayed portion of the list does in fact, correspond with one of the series of associated reference characters, determining which position in the series of associated reference characters the reference character corresponding with the first character of the first item of the first displayed portion of the list holds; and (3) replacing the first displayed portion of the list with the second displayed portion of the list such that the first character of the first item of the second displayed portion of the list corresponds to a reference character having a next successive position in the series of associated reference characters. As part of the cycling process, when the same tab is selected repeatedly, the displayed portions of the list continue to cycle in the order of the reference character series on the tab. Thus, when the reference character corresponding with the first character of the first item of the first displayed portion holds a "last" position in the series of reference characters, the next position is a "first" position in the series of reference characters.

When the newly selected tab is different from the previously selected tab, the method does not "cycle" as described above. Rather, when the first character of the first item of the first displayed portion of the list does not correspond with one of the series of associated reference characters (on the newly selected tab), the newly displayed portion of the list has a first character of the first item corresponding to a reference character holding a first position in the series of associated reference characters of the newly selected tab.

It should be understood that the above-described methods may be stored as program instructions on machine readable media for performing operations on a computer. Such media include by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of relatively a relatively larger or less mobile item such as a hard disk drive or RAM provided in a computer.

A hand-held computer system in accordance with the present invention includes a CPU, a memory in communication with the CPU, and a display device in communication with the CPU. These elements interact such that the display device is capable of (i) displaying portions of a list of items in response to instructions from the CPU, and (ii) displaying a plurality of tabs in response to instructions from the CPU, which tabs have at least two associated reference characters per tab, with each reference character indexing a specified portion of the list of items. Further, the computer system should be programmed such that each of the plurality of tabs can be selected with a pointer, and when one of the plurality of tabs is selected, the selection causes a first displayed portion of the list of items to be replaced with a second displayed portion of the list. The second displayed portion of the list should have as a first displayed item an item with a first character corresponding to one of the at least two associated reference characters on the selected tab.

In preferred embodiments, the hand-held computer system displays the "first item" in the list of items at the top of the display device and displays the plurality of tabs proximate to the list of items. Additionally, in one embodiment, the display device displays the list of items in alphabetic order, or, in another embodiment, displays the list of items in increasing numeric order. In a further preferred embodiment, the pointer is a stylus, and the CPU recognizes a tap on the display device with the stylus as a selection input.

With these method and system aspects of the present invention, an indexing system for a list of items is provided that allows convenient access to data on computer systems with limited display space. An advantage of the present invention is the tabs which each have at least two reference characters corresponding to the characters in the list of items. A further advantage of the present invention is the ability to quickly access a selected portion of the list by cycling through reference characters with successive selections of a single tab. Thus, the present invention provides convenient and efficient access to a displayed list of items in a computer system having limited display space.

These and other features and advantages of the present invention will become apparent upon reading the following detailed descriptions and studying the various figures of the drawings.

DETAILED DESCRIPTION OF THE PREFERRED EMBODIMENTS

1. Pen-Based Computer Systems

The present invention is well suited for pointer based computer systems such as the pen-based, pen-aware, mouse, track ball, and track pad controlled systems that are currently popular. For the purposes of illustration, the invention will be described in connection with a pen-based system.

Figure 1:
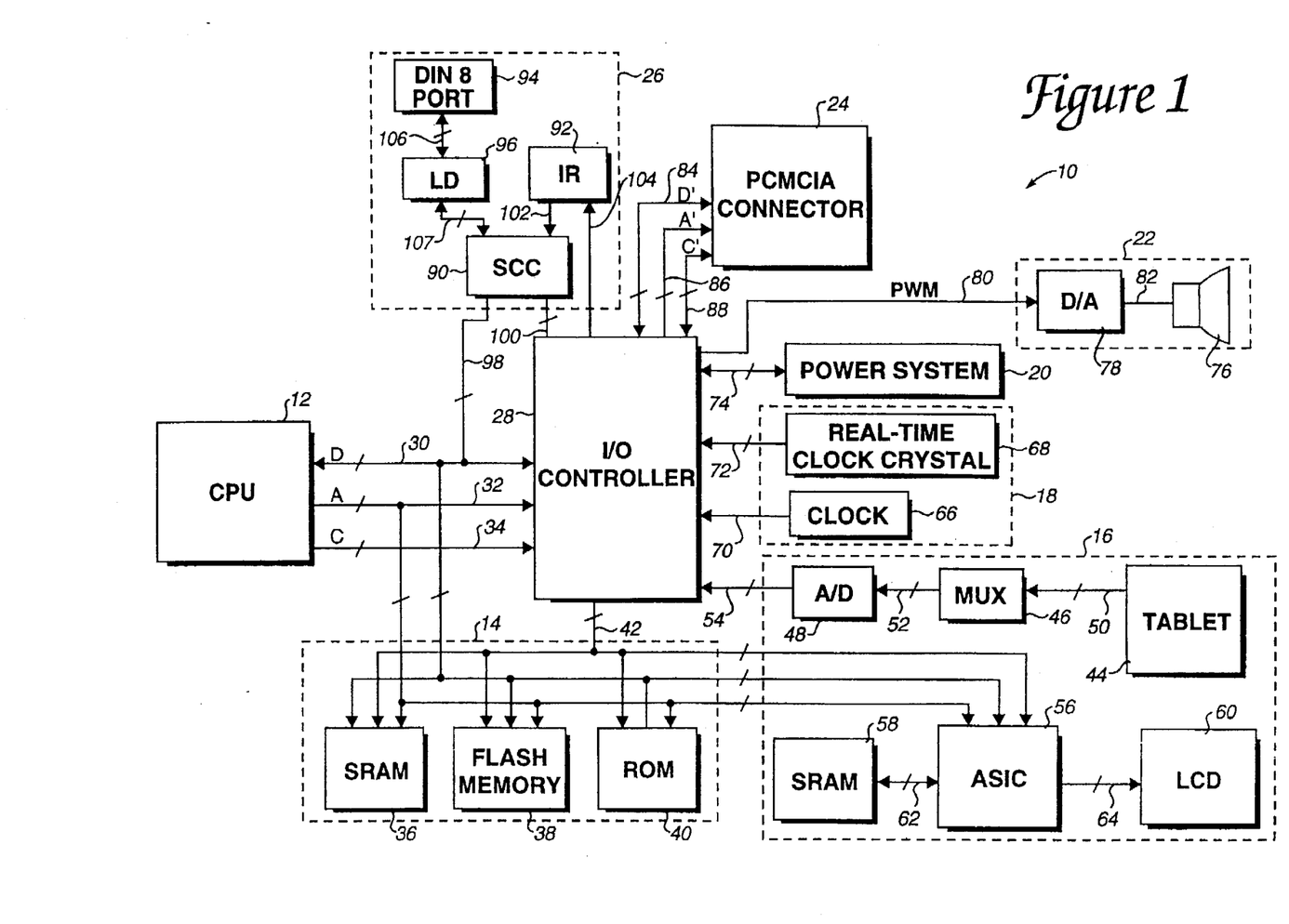
FIG. 1 is a block diagram of the electronics of a pen-based computer system in accordance with the present invention.

As shown in FIG. 1, a block diagram 10 of the electronics of a pen-based computer in accordance with the present invention includes a central processing unit (CPU) 12, a memory system 14, an input/output (I/O) dual function display system 16, a clock system 16, a power system 20, a sound system 22, a PCMCIA connector 24, and a serial I/O system 26. The various components and systems of the computer 10 are coupled together by an I/O controller 28 which serves as an interface between the CPU 12 and other components of the computer 10. More specifically, the I/O controller 28 is an application-specific integrated circuit (ASIC) designed to handle memory, peripherals, and I/O tasks, as well as housekeeping functions such as providing system clocks, controlling power usage, etc. The design, manufacture, and use of ASICs is well known to those skilled in the art. The pen-based computer 10 as illustrated is currently being manufactured and sold by Apple Computer, Inc. of Cupertino, Calif. as a Newton® 120 Personal Digital Assistant (PDA).

CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. In the present embodiment, the CPU 12 is preferably an ARM® 610 RISC chip operating at 20 megahertz and is available from a variety of sources including VLSI Technology, Inc. of San Jose, Calif. and Plessey Semiconductor of England. The present CPU 12 includes a 32 bit data (D) bus 30, a 32 bit address (A) bus 32, and an 8 bit control (C) bus 34.

The memory system 14 includes static random access memory (SRAM) 36, non-volatile read/write "flash" memory 38, and ROM 40. The SRAM 36 serves as volatile "scratch pad" memory for the computer system 10 and, in the current system, includes 512 kilobytes of memory. The flash memory 38 is where user data is stored, preferably includes about 2 megabytes of memory, and is available as a standard product from Intel Corporation of Santa Clara, Calif. The ROM 40 stores the operating system and embedded application programs, and currently comprises approximately 8 megabytes of memory. Of course, there are many equivalents for the SRAM 36, flash memory 38, and ROM 40. For example, dynamic random access memory (DRAM) can be substituted for SRAM 36, battery-backed random accessed memory (RAM) can be substituted for flash memory 38, and a programmable read-only memory (PROM) can be substituted for the ROM 40.

The memory system 14 is coupled directly to the data (D) bus 30 and the address (A) bus 32. The memory system is also coupled to a memory control bus 42 of controller 28. The CPU 12 and controller 28 cooperate to read and write data to the memory system 14 via the busses 30, 32, and 42.

The I/O display system 16 serves as both an input device and an output device. More particularly, a tablet 44, multiplexer (MUX) 46, and analog-to-digital (A/D) converter 48 convert the contact of a stylus (see FIG. 2) with the tablet 44 and its subsequent movement over the tablet into digital data that is input to controller 28. The tablet 44 is preferably a four-wire resistive membrane tablet and provides positional information on a bus 50 which is input into the MUX 46. The MUX 46 determines which of the four sides of the tablet is to be read. Such tablets are widely available from a variety of sources including Nissha of Japan. An output from the MUX 46 is input to A/D converter 48 on a bus 52. An output from the A/D converter 48 is input into the controller 28.

The display system 16 further includes an ASIC 56, a dedicated SRAM 58, and an LCD screen 60. The ASIC 56 is an LCD controller coupled to the data (D) bus 30, the address (A) bus 32, and the memory control bus 42. The purpose of the ASIC 56 is to allow the CPU 12 to write to the screen as if it were a RAM sitting on the memory bus 42. The SRAM 58 is coupled to the ASIC 56 by a dedicated bus 62, and the screen 60 is coupled to the ASIC 56 by a dedicated bus 64. The ASIC 56 serves as a controller for the screen 60, and uses the SRAM 58 as a frame buffer to store images to be displayed on the screen 60. The LCD screen 60 is preferably a standard super-twist LCD matrix screen available from a number of sources including Seiko-Epson of Japan. The LCD screen preferably comprises a rectangular array of picture elements or "pixels", as is well known to those skilled in the art.

The clock system 18 includes a main system clock 66 and a real-time clock (RTC) crystal 68. The main system clock is a four-terminal oscillator and is used to provide the master clock for the computer 10. In the present embodiment, the main system clock 66 operates at 40 megahertz. Oscillator clocks such as clock 66 can be commercially obtained from many sources including Seiko-Epson of Japan. This master clock may be divided down by the controller 28 for various timing purposes in the system, and is coupled to the controller 28 by a line 70.

The RTC crystal 68 is tuned to 32.768 kilohertz, which is evenly divisible by a power of 2. The RTC crystal 68 forms the basis of a crystal based oscillator that can provide a continuous, precise, uninterrupted signal at 1 hertz by dividing down the 32.768 kilohertz crystal signal with a 10 bit divider. The circuitry for performing this type of task is well-known, and form a part of controller 28 in this embodiment. The one hertz RTC signal increments a RTC counter (also a part of the controller 28) to count of the total number of seconds that has elapsed since midnight, Jan. 1, 1904. The value in the RTC counter can be converted into time of day and date information by relatively straight-forward calculations well known to those skilled in the art. Since the RTC crystal 68 is coupled to the controller 28 by a dedicated two-line bus 72 to provide the 32.768 kilohertz signal to the controller 28.

The power system 20 provides power to the computer 10 and is coupled to the controller 28 by a dedicated bi-directional bus 74. The bus 74 allows for the handling of fault detection signals (e.g. low power), switching on and off power to the PCMCIA connector, etc. The power system 20 preferably controls the power system 20 to conserve power at times of low usage of the pen-based computer system.

The sound system 22 includes a small (18 mm diameter) loudspeaker 76 and a D/A converter 78. The D/A converter 78 is coupled to the controller 28 by a line 80, and to the loudspeaker 76 by a line 82. In the present embodiment, the D/A converter 78 is a simple operational amplifier (OP AMP) which acts as an integrator to integrate pulse width modulation (PWM) signals developed on line 80 to provide an analog signal on line 82 to drive loudspeaker 76. Of course, more complex D/A converters can also be used to provide higher quality sound output from loudspeaker 76, as will be apparent to those skilled in the art. Suitable OP AMPS to be used as a D/A converter 78 are readily available on the commercial market, and the miniature loudspeaker is also readily available, such as from Hosiden of Osaka, Japan.

The PCMCIA connector 24 is coupled to the controller 28 by a dedicated data (D') bus 84, a dedicated address (A') bus 86, and a dedicated control (C') bus 88. The PCMCIA specifications for signals on the dedicated data, address, and control busses are industry standard and highly available as the "PC Card" or "PCMCIA" standard. A variety of devices can fit in the PCMCIA slot 24, including memory expansion cards, miniature hard disk drive cards modem cards, and pager cards, to name a few.

The serial I/O system 26 includes a Serial Communications Controller (SCC) 90, an infrared (IR) transceiver 92, a serial port 94, and a line driver (LD) 96. The SCC 90 is coupled to the data bus (D) 30 by a bus 98 and to the controller 28 by a bus 100. A suitable SCC 90 can be purchased from Zilog Corporation of San Jose, Calif. as part number Z85C30. The Zilog Z85C30 has been available since at least the early 1980's and supports a number of serial protocols. The IR transceiver 92 is coupled to the SCC 90 by a line 102 for received IR signals, and to the controller 28 for IR signals to be transmitted. The IR transceiver includes an IR transmitter (coupled to line 104) and an IR receiver (coupled to line 102), and is available under license from Sharp Corporation of Japan. The IR receiver includes a PIN-type IR-sensitive diode having an output coupled to an analog demodulator and an amplifier to create a signal on line 102, an IR LED coupled to line 104 to be directly driven by a high-power switch of controller 28. The serial port 94 is a standard DIN 8 (8 pin) connector, and is coupled to the line driver LD 96 by an eight bit bus 106. The LD 96 is coupled to the SCC 90 by a bus 107.

Figure 2:
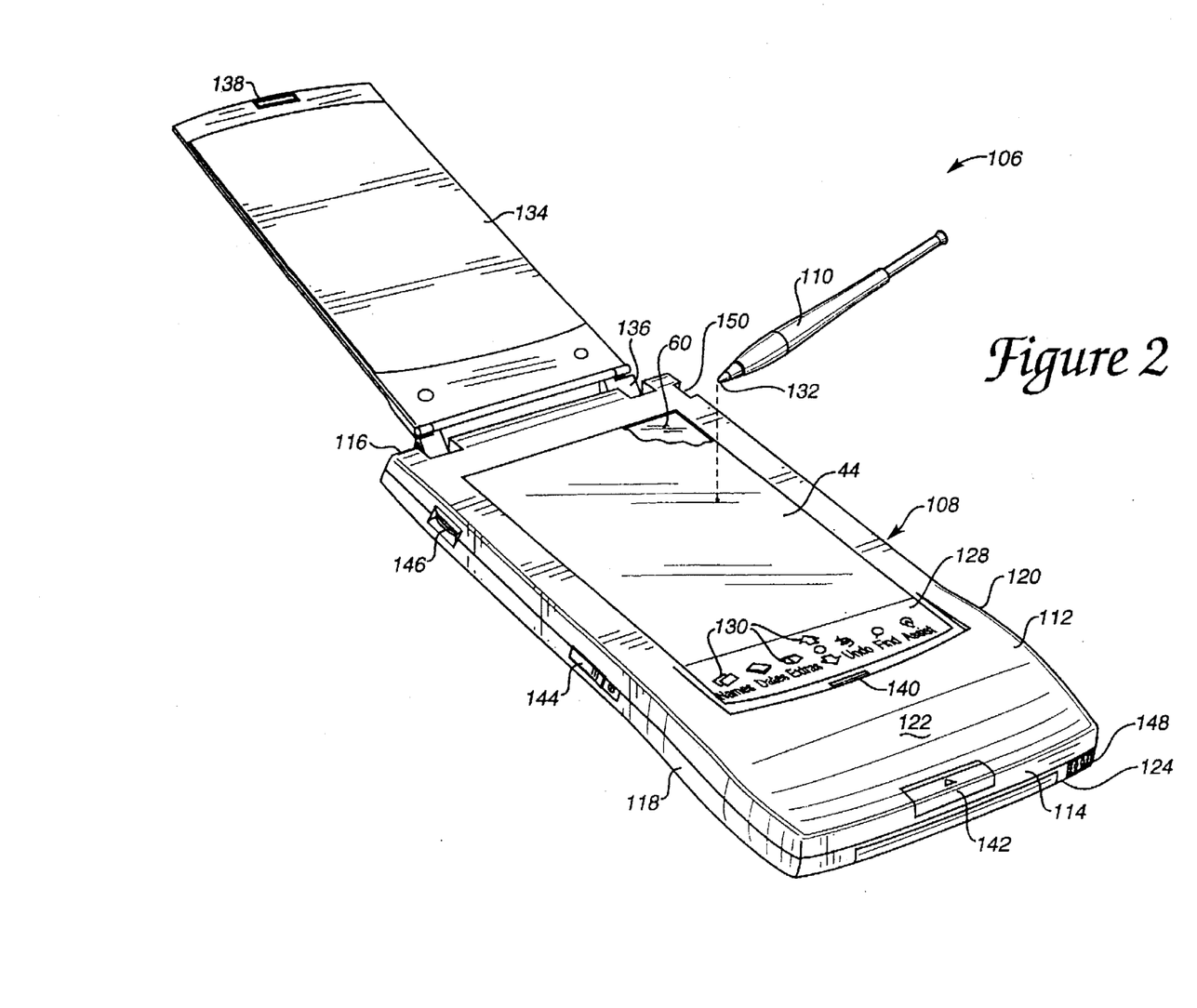
FIG. 2 is a perspective view of a complete pen-based computer system including a housing, display assembly, and stylus, where the electronics of FIG. 1 are enclosed within the housing.

Referring now to FIG. 2, a pen based computer system 106 in accordance with the present invention includes the computer 108 and a pen or stylus 110. The computer 108 is enclosed within a generally flat, rectangular case 112 having a front end 114, a back end 116, a left side 118, a right side 120, a top 122, and a bottom 124. The LCD 60 is positioned along the top 122 of the case 112, and the clear membrane tablet 44 is positioned over the LCD 60. Also positioned beneath the tablet 44 along a lower edge 126 thereof, is a printed strip of material 128 including a number of indicia 130. When the tip 132 of the stylus 110 is engaged with the membrane 44 over one of the indicia 130, the computer 108 can respond to the contact as if the indicia were a "button." Therefore, as used herein, a "button" can be an image seen through the tablet 44 (either from the screen 60 or from printed material 128 or the like) that can serve the function of an electro-mechanical button or the like when the tablet 44 is activated over a button image.

A lid 134 is connected to the back end 116 of case 112 by hinge 136. When open as shown or folded back to contact the bottom 124 of case 112, the tablet 44 and screen 60 are available for use. When the cover 134 is folded over the top 122 of case 112, it fully covers the tablet 44 to protect the delicate membrane material. The lid 134 is provided with a latch member 138 which engages a latch member 140 when it is overlying the top 122 of the computer. The latch member 138 is disengaged from the latch member 140 by a mechanical latch release 142.

Also seen in FIG. 2 is an "on" switch 144, a contrast adjustment 146, and a grille 148 for the speaker 76. The stylus 110 is of a collapsible design and can fit into an opening 150 along the right side 120 of case 112. Not seen in this figure along the right side 120 of the case 112 is an opening for a PCMCIA card which can engage PCMCIA connector 24, the DIN 8 port 94, and power input jack. Not seen along the bottom 124 of the case 112 is a battery access cover and a mechanical ejection button for a PCMCIA card engaged with the PCMCIA connector 24. The IR port 92 is provided along back 116 of the case 112 and is exposed for use when the cover 134 is folded against the bottom 124 of the case 112. The remaining components and systems of the computer block diagram 10 of FIG. 1 are enclosed within the case 112 of the computer system 108.

It should be noted that the preceding discussion is of a preferred embodiment of the present invention, and that there are many alternatives for the stylus 110 as illustrated. For example, a fingernail or other pointed object could be used with the tablet 44 of the present invention. Also, there are other types of tablets available that utilized other types of stylus.

Other types of pointing devices can also be used in conjunction with the present invention. While the method of the present invention is described in the context of a pen-based system, other pointing devices such as a computer mouse, a track ball, a track pad, a tablet, etc. can be used to manipulate a pointer on a screen of a general purpose computer. Therefore, as used herein, the terms "pointer", "pointing device", "pointing apparatus", "pointing means", and the like will refer to any mechanism, device, or system for designating to a particular location on a screen of a computer display.

Figure 3:
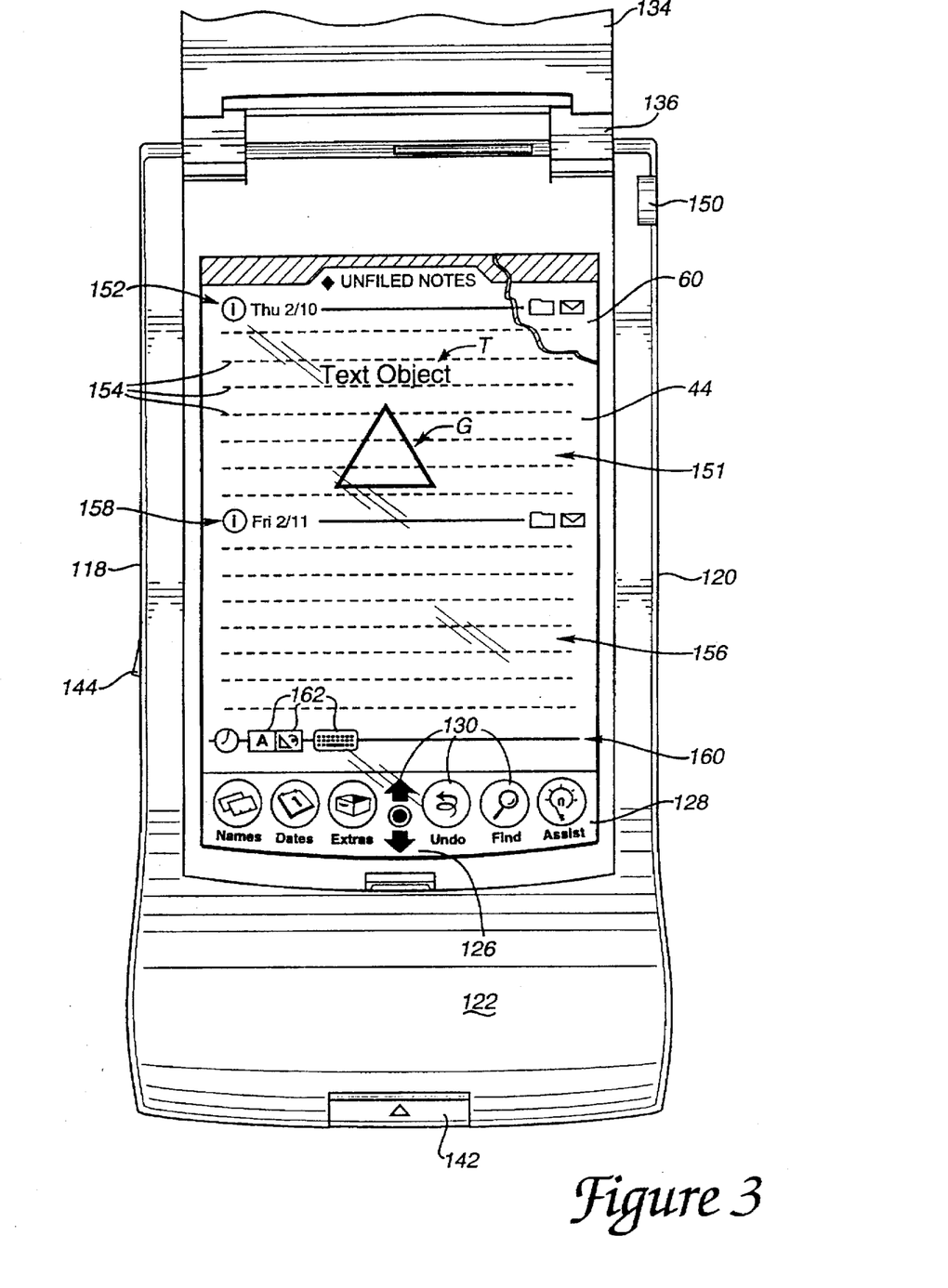
FIG. 3 is a top plan view of the housing and display assembly of pen-based computer system of FIG. 2.

With additional reference to FIG. 3, information is input into the pen-based computer system by "writing" on the tablet 44 with stylus 110 or the like. Information concerning the location of the tip 132 of stylus 110 on the tablet 44 of the display system 16 is input into the CPU 12 via controller 28. Typically, this information comprises the Cartesian (i.e. x & y) coordinates of a pixel of the screen 60 over which the tip 132 of the stylus 110 is positioned. The CPU 12 then processes the data under control of an operating system (stored in ROM 40) and possibly an application program stored in memory system 14 or elsewhere (such as on a PCMCIA card engaged with PCMCIA connector 24). The CPU 12 next produces data which is transferred to the screen 60 via ASIC 56 to produce appropriate images on the screen.

Upon power-up, pen based computer system 106 displays on screen 60 an initial "note" area 150 including a header bar 152 and a number of guidelines 154. The header bar 152 preferably includes the date of creation of the note area 150 and a number of icons and "soft" buttons, not particularly germane to the discussion of the present invention. The guidelines 154 aid a user in entering text, graphics, and data into the pen-based computer system 106. A text object T of the text "Text Object" and a graphic object G of a triangle are shown as being entered within note area 150.

Additional note areas, such as a second note area 156, can be formed by the user by drawing a substantially horizontal line across the tablet 44 with the stylus 110. The substantially horizontal line is recognized by the computer system 106 and is converted into a second header bar 158. Additional text, graphical, and other data can then be entered into this second note area 156.

The screen illustrated in FIG. 3 is referred to as the "notepad", and is preferably an application program running under the operating system of the pen based computer system 10. In this preferred embodiment, the notepad is a special or "base" application which is usually or normally available beneath higher level applications. The notepad application, like other applications, run within a window, which in this instance comprises the entire screen 60. Therefore, as used herein, a "window" is the entire screen or any portion of an entire screen which is dedicated to a particular application program. A description of the operation and use of the notepad can be found in U.S. Pat. No. 5,398,310, assigned to the assignee of the present invention, and incorporated herein by reference.

A status bar 160 is provided at the bottom of the notepad application. The status bar 160 is provided with a number of active and display areas, which again are not particularly germane to the present invention and will therefore not be discussed in detail herein.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh*, by Kurt J. Schmucher, Hayden Book Company, 1986.

In the present invention, objects may be implemented as part of a frame system that comprises frame objects related by a semantic network. A description of semantic networks can be found in "A Fundamental Tradeoff in Knowledge Representation and Reasoning", *Readings in Knowledge Representation*, by Brachman and Leveseque, Morgan Kaufman, San Mateo, 1985.

It will be noted there is a liberal use of graphic elements in the present invention. For example, the header bars 152 and 158 include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh, Volumes I, II and III*, by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 60 can form a first or "root" layer, with the status bar 160, for example, positioned in a second layer "over" the root layer. The various buttons 162 of the status bar 160 are positioned in a third layer "over" the second and root layers. The view system automatically handles "taps" and other gestures of the stylus 110 on the screen 60 by returning information concerning the tap or gesture and any object to which it may be related. U.S. patent application Ser. No. 07/976,970 filed Nov. 16, 1992 on behalf of Foster et. al, entitled "Status Bar for Application Windows" and assigned to the assignee of the present invention describes a preferred view system and how to make and use the status bar, and is incorporated herein by reference.

The object oriented programming and view system software makes the implementation of the processes of the present invention less cumbersome than traditional programming techniques. However, the processes of the present invention can also be implemented in alternative fashions, as will be well appreciated by those skilled in the art.

2. Tab Indexing with Multiple Reference Characters Per Tab

Figure 5A:
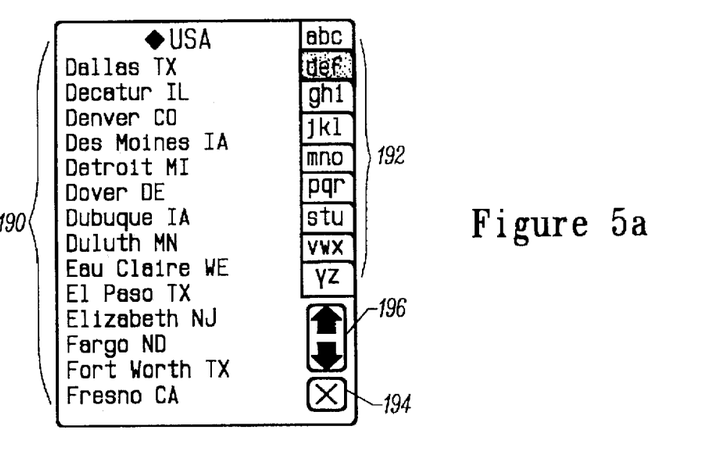
FIGS. 5a–5c are screen shots from an application program illustrating how tab cycling may be implemented.

The present invention provides an indexing system for lists of items which are stored in and must be accessed by computer systems having limited display space—such as hand-held and/or pen-based systems. In all instances, the indexing system has two display features. First, the system displays a portion of the list of items. This is illustrated in FIG. 5a, where a list of cities 190 is displayed on the left side of a display screen. As is apparent from this figure, the display screen is too small to simultaneously display the entire list of items (e.g., the displayed list of cities). The second displayed feature of the indexing system is a collection of index tabs, such as tabs 192 shown in FIG. 5a. Many such tabs include multiple "characters" or index headings. For example, each tab 192 in the FIG. 5a index system includes three characters, with the exception the "yz" tab which contains only two characters. By employing multiple reference characters per tab, the indexing system conserves space on the small computer display screen. It would be backward to attempt to include a single tab for each of the 26 English alphabet letters.

When a tab is selected, as by tapping on it with a stylus, the portion of the list of items associated with that selective tab is displayed on the computer screen. To quickly access a specified character within a tab (e.g., the "f" character of the "def" tab), a tab cycling routine is employed which will be described hereinafter.

Figure 4:
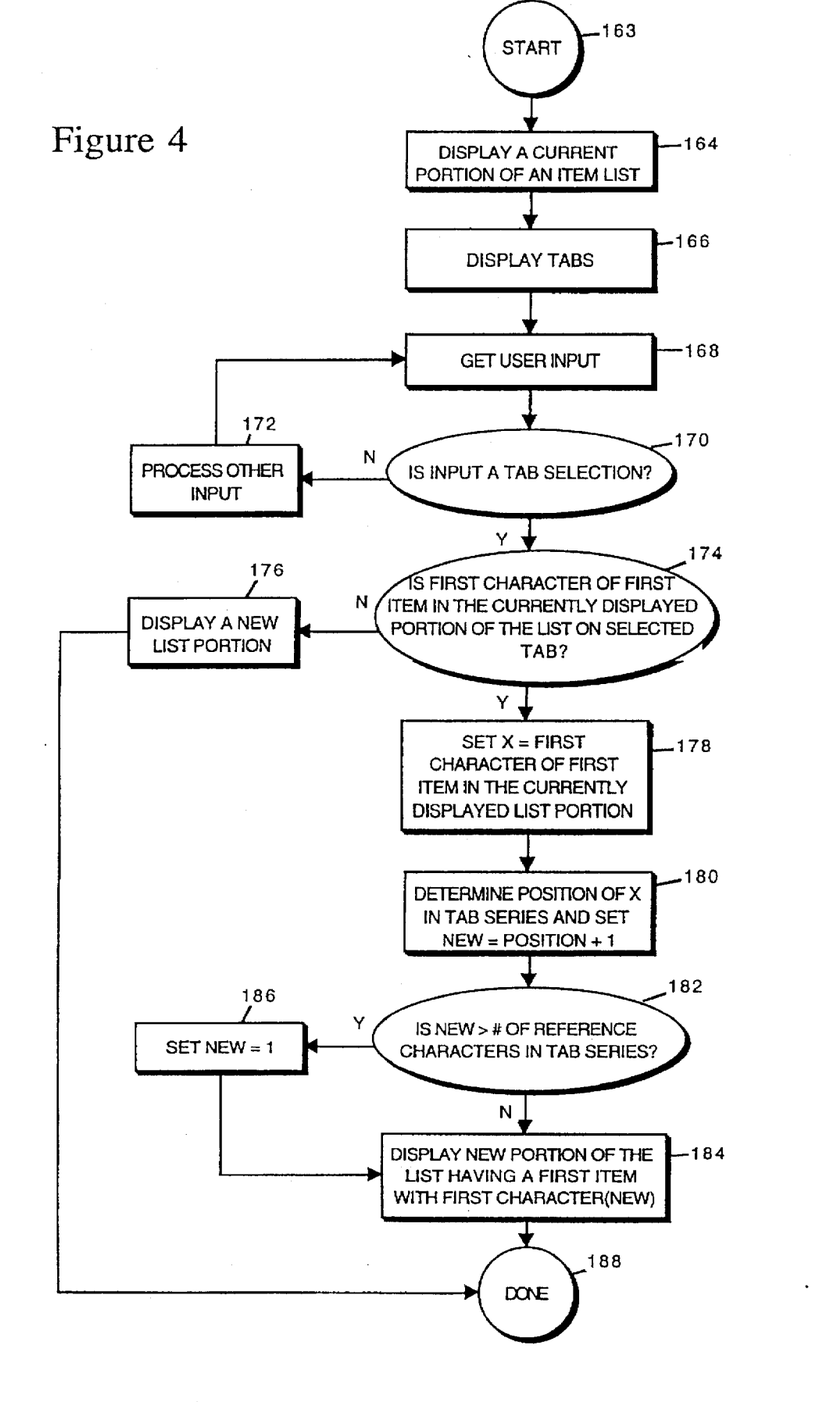
FIG. 4 is a flow diagram of a method for tab access and cycling in accordance with the present invention.
Figure 5B:
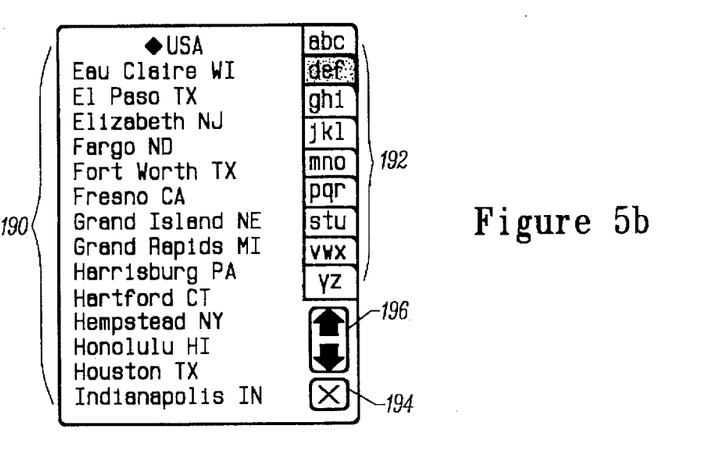
Figure 5C:
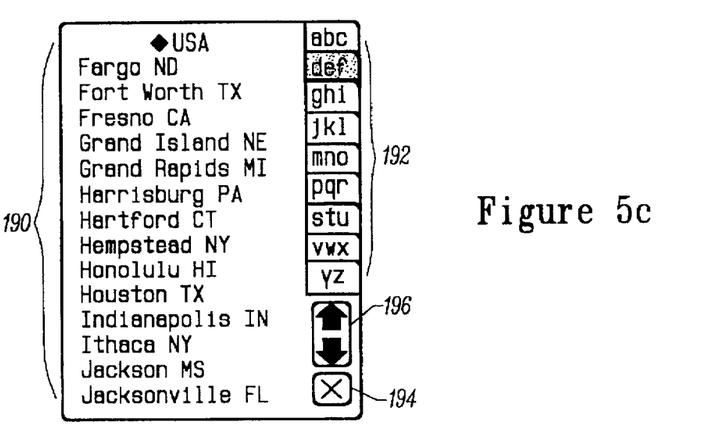
Figure 6A:
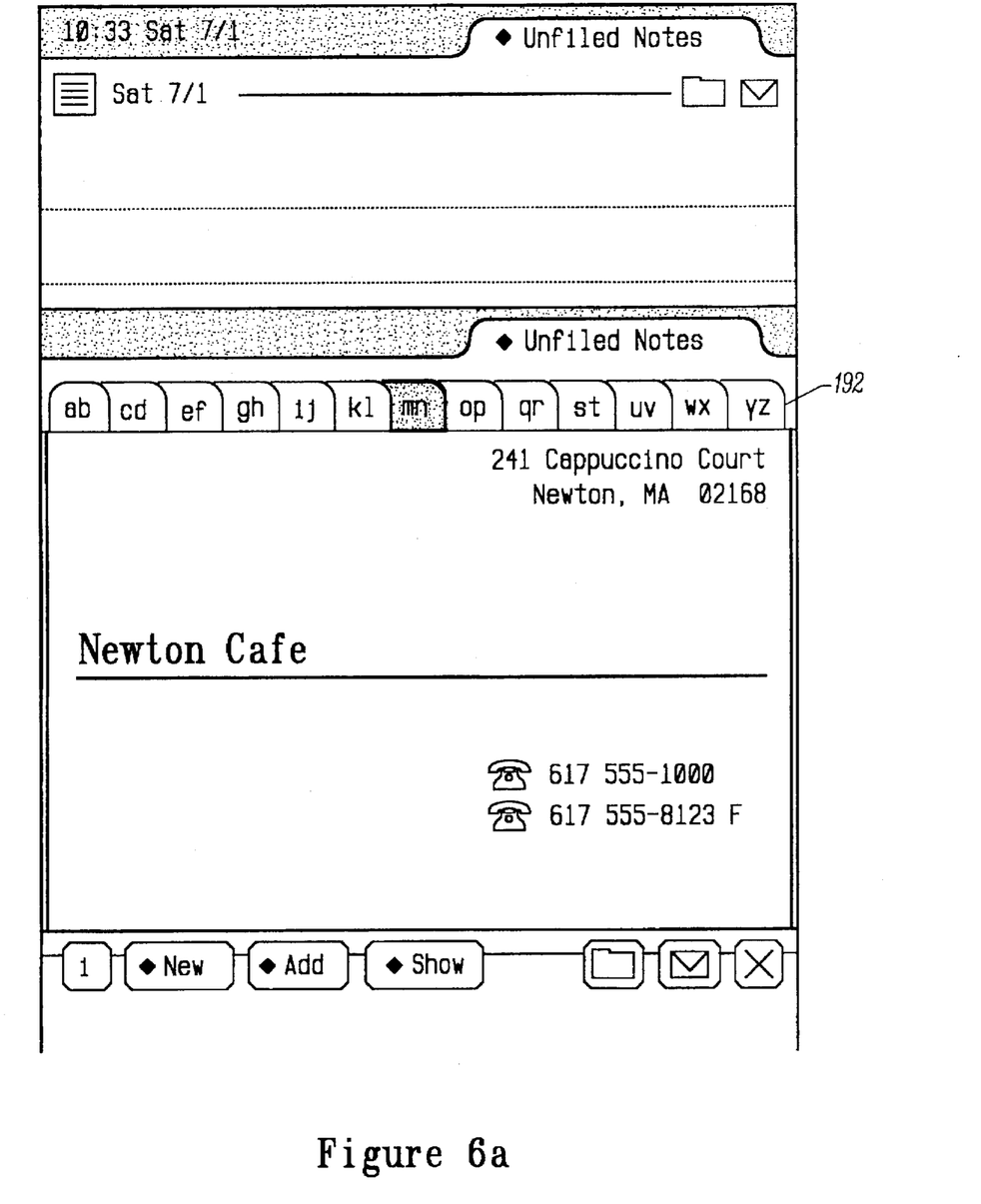
FIGS. 6a–6c are screen shots from application programs utilizing tab access and tab cycling in accordance with the present invention.
Figure 6B:
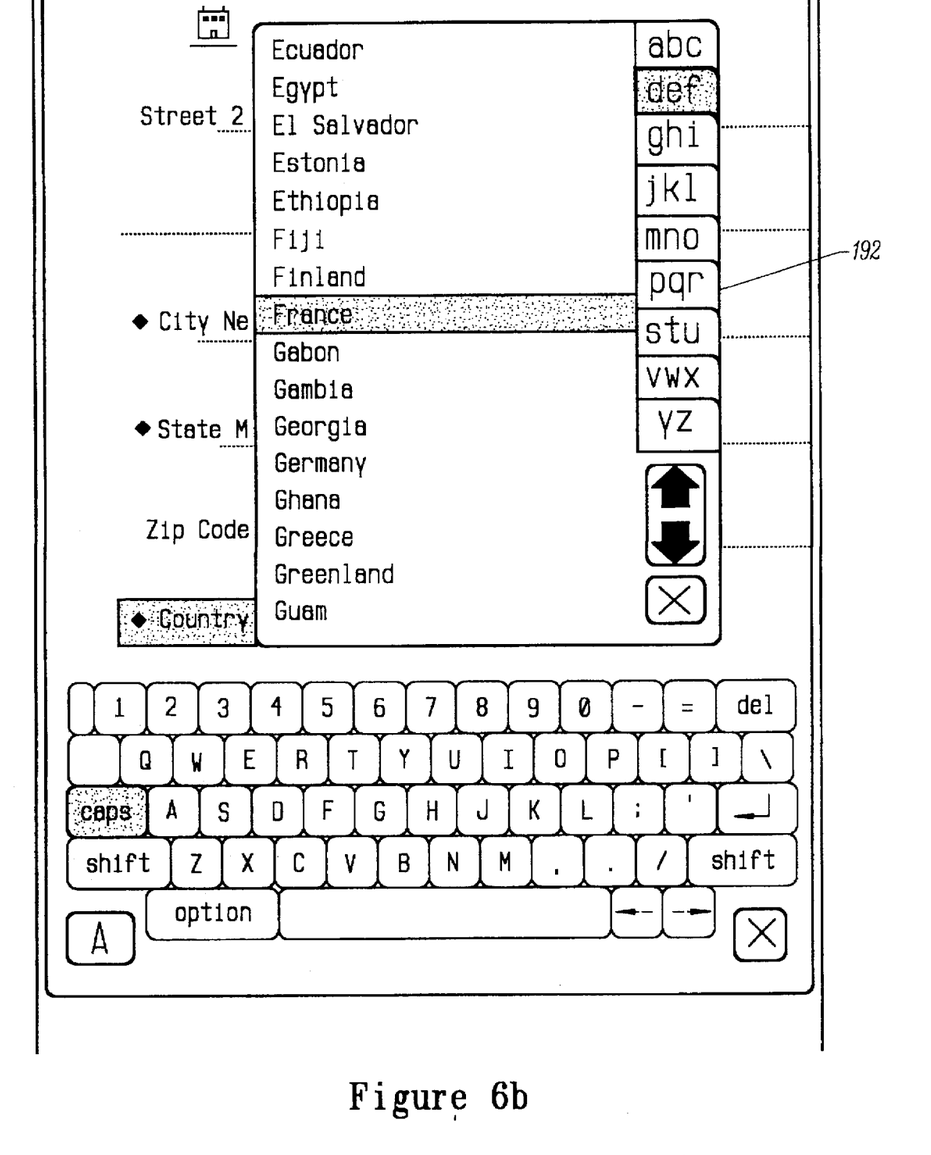
Figure 6C:
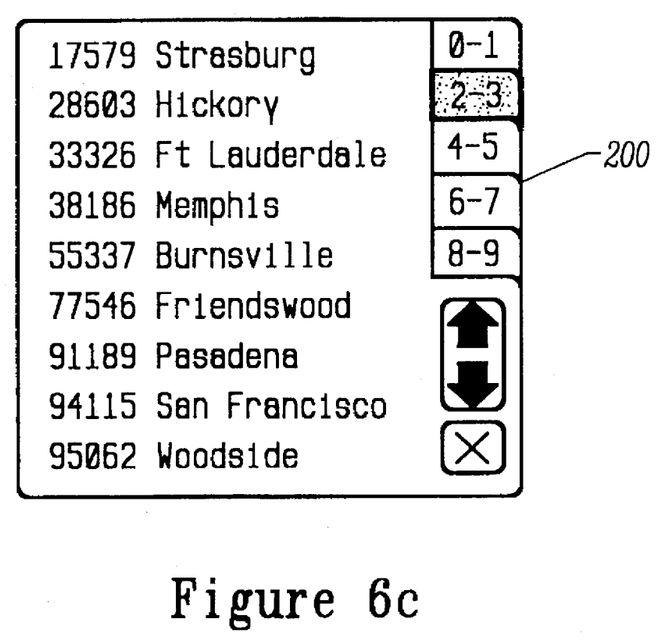

FIG. 4 is a process flow diagram of a method for accessing a portion of a list of items through tab selection in accordance with the present invention. Preferably, the method is included as a part of the operating system of the pen-based computer system to allow incorporation into multiple application programs. Further, the method is preferably implemented as one of many views offered by the operating system through the above-described view system. Examples of applications that could profitably include the features of the present invention include a geographical locator program such as illustrated in FIGS. 5a–5c, a personal "ROLODEX"® program such as illustrated in FIG. 6a, a country identifier program such as illustrated in FIG. 6b, and a zip code program such as illustrated in FIG. 6c. The screen shots of FIGS. 5a–c and 6a–c are further discussed below.

Referring now to steps of FIG. 4, the method begins at 163 and continues with the displaying of a current portion of a list of items having a predetermined order, e.g., alphabetic or increasing numeric order, on the display screen 60 via a step 164. As noted, the displayed list of items could include a list of city and state names, a list of country names, a list of files holding personal places of interest, a list of zip codes etc. The lists and items shown by FIGS. 5a–c and 6a–c merely illustrate examples of possible types of lists. Of course, other applications having other types of lists are equally suitable for use with the present invention.

Along with the displayed list of items, a group of tabs is displayed, via a step 166. It should be appreciated that although the displaying of the list of items and the group of tabs are presented as two separate steps in the flow diagram, both displays typically appear to a user as occurring substantially simultaneously as one output to the screen. As an example of the displayed tabs, FIG. 5a shows a list of city and state names-with corresponding tabs 192 shown vertically along the right-hand side of the list. As illustrated by FIG. 6a, as an alternative to displaying the tabs vertically, the tabs 192 can also be displayed horizontally across the screen.

Some of the tabs include at least two reference characters each of which act as indexers for entry points into the displayed list. Each tab preferably has associated positions for the reference characters included on the tab, e.g., first position, second position, . . . , and last position. For example, "def" tab shown highlighted in FIG. 5a has the "d" character in the first position, the "e" character in the second position, and the "f" character in the third (or last) position. The number of reference characters (and positions) displayed in each tab 192 is mainly dependent on two factors. A first factor is the screen size, which limits the number of tabs that can be displayed in a normal font size, and a second factor is the number of characters in the character set represented by the reference characters, e.g., the 26 characters in the character set of the English alphabet.

A "reference character", as used herein, preferably refers to any type of character as used in the listed items and includes numeric and alphabetic characters. For example, as illustrated by the screen shot of FIG. 6c, the list of items may include numeric values, such as zip codes, so that a collection of tabs 200 correspondingly have numeric reference characters, e.g., 0–1, 2–3, 4–5, etc.

Preferably the tab having a reference character corresponding with the first character of the first item in the displayed list is highlighted. For example, in FIG. 5a, tab "def" is highlighted. As long as the first item of the displayed list begins with one of the letters "d", "e", or "f".

Returning now to FIG. 4, once the portion of the list of items is displayed along with the tabs, the process continues with the receipt of a user input, via a step 168. A determination is then made via a decision step 170 of whether the input received is a selection input on a displayed tab. A selection input, for purposes of this discussion, preferably refers to a "tap" on the display screen with a stylus, but other forms of inputs for tab selection (such as moving a pointer to a tab) could be implemented without departing from spirit and scope of the present invention. When the determination is made that a tap has not been input on a tab, the received input is processed as another input via a step 172 before the process returns to step 168 to await the next user input. Such other inputs include, for example, selecting some other area of the displayed screen, such as close box 194 of FIG. 5a. Further, for those displayed lists including a scroll button, such as scroll button 196 in FIG. 5a, the selection of the scroll button suitably implements the scrolling of the displayed list either forward or backward, as determined by the selected scroll button. The details of processing pen-based inputs generally are not particularly relevant to this discussion and may be found in U.S. patent application Ser. No. 08/452,352 filed May 26, 1995, naming Beernink et al. as inventors, and entitled "GESTURE SENSITIVE BUTTONS FOR GRAPHICAL USER INTERFACES." That document is incorporated herein by reference for all purposes.

When the input is a tab selection input (by, e.g., a tap on a tab) the selected tab is highlighted, and the process continues via a decision step 174 with a determination of whether a first character of a first displayed item in the currently displayed portion of the list of items corresponds with one of the reference characters on the selected tab. Typically, the first displayed item refers to the item displayed at the top of the display screen 60, but in some embodiments it may be displayed at other locations of the screen such as the far left, far right, or bottom. When the first character does not correspond to one of the reference characters of the selected tab, the currently displayed portion of the list is replaced with a newly displayed portion of the list, via a step 176. This newly displayed portion of the list preferably has as its first displayed item, an item having a first character that corresponds with the first reference character of the displayed tab. The process is then completed at 188. For example, referring back to FIG. 5a, if the displayed list started with San Jose, Calif. and the "def" tab were selected, the newly displayed portion of the list would start with Dallas, Tex., since Dallas, Tex. is the first item in the list having a first character "d."

When the first character of the first item does correspond with one of the reference characters on the selected tab (i.e., decision step 174 is answered in the affirmative), the process continues via a step 178 which sets of a variable "x" equal to the first character of the first item in the currently displayed list. A determination of the position of character "x" in the tab series is then made and a variable "new" is set equal to one greater than the position corresponding to "x", via a step 180. That is, each character displayed on the tab has a defined position in a series, and the current reference character position is adjusted by one at step 180. For example, if the first displayed, item is the city Dallas as shown in FIG. 5a, then "x" is the character "d" which is in the first position of the "def" tab. Thus "new" is the second position in the tab, and character (new) is "e".

A determination of whether the value assigned to "new" is greater than the total number of reference characters on the selected tab is then made via a decision step 182. If "new" does not exceed the total number of reference characters (and positions) on the selected tab, a new portion of the list is displayed via a step 184. This new displayed portion of the list has a first item with a first character corresponding to the reference character having a position in the tab series equal to the value of "new." The process is then concluded at 188. If the determination is made that the value of "new" does exceed the total number of reference characters, the value of "new" is then set equal to the first position of the series of reference characters, i.e., a value of "1" via a step 186. Then, a new portion of the list is displayed via step 184 such that the first item in this new portion has as its first character, the first reference character in the tab series. Thereafter the process is completed at 188. By these steps, repeated selection of the same tab results in a cycling through the lists of reference characters on the selected tab.

As an example of the advantages of the cycling and tab access of the present invention, referring to FIG. 5a, suppose that the "def" tab is selected so that the displayed portion of the list presents Dallas, Tex. as the top (first) item. Note that the "def" tab is highlighted at this point. When a subsequent selection tap is received on the "def" tab, the process of the present invention determines that since the character "d" from the first displayed item Dallas, Tex. is included in the series of reference characters on tab "def" (decision step 174), the selection of the tab indicates the user's desire to jump to the first entry for the next reference character "e". Thus, the system presents a new displayed portion of the list in which the first displayed item becomes the Eau Claire, Wis. entry, as shown in FIG. 5b, since Eau Claire is the first item in the list to have a first character of "e". Note that the "def" tab remains highlighted. Next, when the list is displayed forward from Eau Claire, a repeated selection of tab "def" causes the displayed portion of the list to be updated to show the Fargo, N.D. entry first, as shown in FIG. 5c, since Fargo, N.D. is the first item in the list to have a first character of "f". To complete the cycle with this example, another selection of "def" would result in redisplaying the portion of the list having the Dallas, Tex. entry provided first since Dallas is the first list item starting with a "d."

As shown by this example, the present invention provides for cycling through a series of reference characters to achieve convenient access to and retrieval of a desired portion of a list of items. Of course, upon a selection of another tab, such as tab "abc", the displayed list would be updated to display the portion of the list in which the first item starts with the letter "a."

Using the tab access of the present invention, a portion of a list of items is quickly and easily located. Such ease of access is particularly useful in a hand-held computer system or other similar system having limited display space to display a list of items. Users can retrieve and display a desired portion of the list through tab selection rather than having to scroll through the entire list. Further, as mentioned previously, repeated selection of a same tab results in the cycling through of the list of items in a sequence according to the series of reference character on the tab. This cycling further enhances the ability to expediently access a particular portion of the listed items.

While this invention has been described in terms of several preferred embodiments, there are alterations, permutations, and equivalents which fall within the scope of this invention. It should also be noted that there are may alternative ways of implementing the processes of the present invention. For example, much of the programming can be simplified by using the high-level utilities and data structures mentioned in the preceding specification. In particular, the described frame database system is preferred for simplifying the programming tasks required by the computer implemented processes of the present invention, but there are many other database and graphics systems which can be used to accomplish the same task.

It is therefore intended that the following appended claims be interpreted as including all such alterations, permutations, and equivalents as fall within the true spirit and scope of the present invention.

What is claimed is:

1. A method implemented in a computer system for tab access to a desired portion of a list of items, the list of items having a predetermined order, the method comprising:

displaying on a display screen of the computer system a first displayed portion of the list of items;

displaying on the display screen a plurality of tabs, each tab displaying a series of at least two associated reference characters, the reference characters on the plurality of tabs indexing items throughout the list;

receiving a selection input with a pointer on one of the plurality of tabs;

replacing the first displayed portion of the list with a second displayed portion of the list which second displayed portion has as a first displayed item an item with a first character that corresponds to one of the at least two associated reference characters displayed on the selected tab; and cycling through the series of at least two associated reference characters when at least two successive selection inputs are received on the selected tab.

2. The method of claim 1, wherein the computer system is a handheld computer.

3. The method of claim 1 wherein the step of replacing includes the following steps:

determining whether the first character of the first item of the first displayed portion of the list corresponds to one of the series of at least two associated reference characters on the selected tab;

when the first character of the first item of the first displayed portion of the list does correspond with one of the series of associated reference characters, determining which position in the series of associated reference characters the reference character corresponding with the first character of the first item of the first displayed portion of the list holds; and replacing the first displayed portion of the list with the second displayed portion of the list such that the first character of the first item of the second displayed portion of the list corresponds to a reference character having a next successive position in the series of associated reference characters.

4. The method of claim 3 wherein when the reference character corresponding with the first character of the first item of the first displayed portion holds a last position in the series of reference characters, the next position is a first position in the series of reference characters.

5. The method of claim 1 wherein the step of replacing includes the following steps:

determining whether the first character of the first item of the first displayed portion of the list corresponds with one of the series of at least two associated reference characters on the selected tab;

when the first character of the first item of the first displayed portion of the list does not correspond with one of the series of associated reference characters, replacing the first displayed portion of the list with the second displayed portion of the list such that the first character of the first item of the second displayed portion of the list corresponds to a reference character having a first position in the series of associated reference characters of the selected tab.

6. The method of claim 1 wherein the at least two associated reference characters include alphabetic characters.

7. The method of claim 1 wherein the at least two associated reference characters include numeric characters.

8. The method of claim 1 wherein the computer system is a pen-based computer system, the display screen is a touch-sensitive display screen, and the pointer is a stylus.

9. The method of claim 8 wherein the selection input includes a tap with the stylus on one of the tabs displayed on the display screen.

10. The method of claim 1 wherein the selected tab is highlighted on the display screen.

11. The method of claim 1 wherein the first displayed item is displayed at the top of the display screen.

12. A computer system comprising:

a CPU;

a memory in communication with the CPU; and a display device in communication with the CPU, the display device being capable of (i) displaying portions of a list of items in response to instructions from the CPU, the list having a predetermined order, and (ii) displaying a plurality of tabs in response to instructions from the CPU, the tabs having at least two associated reference characters per tab, with each reference character indexing a specified portion of the list of items, wherein each of the plurality of tabs can be selected with a pointer, and wherein when one of the plurality of tabs is selected, the selection causes a first displayed portion of the list of items to be replaced with a second displayed portion of the list on the display screen, such that the second displayed portion of the list has as a first displayed item an item with a first character corresponding to one of the at least two associated reference characters on the selected tab, and wherein when at least two successive selection inputs are received on the selected tab, the inputs cause a cycling through of the series of at least two associated reference characters.

13. The computer system of claim 12 wherein the display device displays the first displayed item at the top of the display device.

14. The computer system of claim 12 wherein the display device displays the plurality of tabs proximate to the list of items.

15. The computer system of claim 12 wherein the list of items is displayed in alphabetic order.

16. The computer system of claim 12 wherein the list of items is displayed in increasing numeric order.

17. The computer system of claim 12 wherein the pointer is a stylus.

18. The computer system of claim 17 wherein the CPU recognizes a tap on the display device with the stylus as a selection input.

19. The computer system of claim 12, wherein the computer system is a handheld computer.

20. A computer readable medium containing program instructions for tab access to a desired portion of a list of items stored in a computer system, the list of items having a predetermined order, the medium including instructions for performing the following steps:

displaying on a display screen of the computer system a first displayed portion of the list of items;

displaying on the display screen a plurality of tabs, each tab displaying a series of at least two associated reference characters, the reference characters on the plurality of tabs indexing items throughout the list;

receiving a selection input with a pointer on one of the plurality of tabs;

replacing the first displayed portion of the list with a second displayed portion of the list which second displayed portion has as a first displayed item an item with a first character that corresponds to one of the at least two associated reference characters displayed on the selected tab; and cycling through the series of at least two associated reference characters when at least two successive selection inputs are received on the selected tab.

21. The computer readable medium of claim 20 wherein the program instructions for the step of replacing includes instructions for performing the following steps:

determining whether the first character of the first item of the first displayed portion of the list corresponds to one of the series of at least two associated reference characters on the selected tab;

when the first character of the first item of the first displayed portion of the list does correspond with one of the series of associated reference characters, determining which position in the series of associated reference characters the reference character corresponding with the first character of the first item of the first displayed portion of the list holds; and replacing the first displayed portion of the list with the second displayed portion of the list such that the first character of the first item of the second displayed portion of the list corresponds to a reference character having a next successive position in the series of associated reference characters.

22. The computer readable medium of claim 21 wherein when the reference character corresponding with the first character of the first item of the first displayed portion holds a last position in the series of reference characters, the next position is a first position in the series of reference characters.

23. The computer readable medium of claim 20 wherein the instructions for the step of replacing includes instructions for performing the following steps:

determining whether the first character of the first item of the first displayed portion of the list corresponds with one of the series of at least two associated reference characters on the selected tab;

when the first character of the first item of the first displayed portion of the list does not correspond with one of the series of associated reference characters, replacing the first displayed portion of the list with the second displayed portion of the list such that the first character of the first item of the second displayed portion of the list corresponds to a reference character having a first position in the series of associated reference characters of the selected tab.

24. The computer readable medium of claim 20 further comprising instructions for displaying the at least two associated reference characters as alphabetic characters.

25. The computer readable medium of claim 20 further comprising instructions for displaying the at least two associated reference characters as numeric characters.

26. The computer readable medium of claim 20 wherein the computer system is a pen-based computer system, the display screen is a touch-sensitive display screen, and the pointer is a stylus.

27. The computer readable medium of claim 26 further comprising instructions for recognizing a tap with the stylus on one of the tabs displayed on the display screen as the selection input.

28. The computer readable medium of claim 20 further comprising instructions for highlighting the selected tab on the display screen.

29. The computer readable medium of claim 20 further comprising instructions for displaying the first displayed item at the top of the display screen.

* * * * *